United States Patent Office 2,942,036
Patented June 21, 1960

2,942,036

MANUFACTURE OF HALOPROPANE

Lee B. Smith, Woodbridge, and Cyril Woolf, Morristown, N.J., assignors to Allied Chemical Corporation, a corporation of New York No Drawing. Filed Dec. 13, 1957, Ser. No. 702,535

2 Claims. (Cl. 260—653)

This invention relates to the hydrogenation of 1,2,2 trichloropentafluoropropane, $CF_3CCl_2CClF_2$, and is more particularly directed to 1,2,2 trihydropentafluoropropane $CF_3CH_2CHF_2$, a new product, and to processes for making this compound and 2 monohydropentafluoropropene, $CF_3CH=CF_2$.

Objects of the invention include provision of 1,2,2 trihydropentafluoropropane as a new compound, and provision of easily controllable, catalytic gas-phase methods for making $CF_3CH_2CHF_2$ and $CF_3CH=CF_2$.

In accordance with the invention, it has been found that, by use of certain catalysts and gas-phase reaction conditions, hydrogen may be directly substituted for the chlorine of 1,2,2 trichloropentafluoropropane, and that 1,2,2 trihydropentafluoropropane, 2 monohydropentafluoropropene, and 2 monochloropentafluoropropene if desired, may be made by direct catalytic gas-phase hydrogenation of 1,2,2 trichloropentafluoropropane.

The invention comprises the discovery of the adaptability of $CF_3CCl_2CClF_2$ as an organic starting material, and the discovery of particular catalysts and catalytic reaction conditions, which factors of starting material, catalysts and reaction conditions conjunctively afford accomplishment of the invention objectives.

Practice of the invention comprises hydrogenating 1,2,2 trichloropentafluoropropane by subjecting the same under certain temperature conditions and while in the presence of certain catalysts to the action of hydrogen in quantity and for a time sufficient to effect formation of a substantial amount of a hydrogenated straight-chain three carbon atom hydrocarbon consisting of carbon, fluorine, and hydrogen and having respective terminal carbon atoms tri- and difluorinated and the said difluorinated carbon atom containing from zero to one hydrogen atom, and recovering such hydrogenated hydrocarbon, which may be $CF_3CH_2CHF_2$ or $CF_3CH=CF_2$ or mixtures thereof, from the resulting reaction products.

The organic starting material, 1,2,2 trichloropentafluoropropane, $CF_3CCl_2CClF_2$, a known compound, is a colorless liquid boiling at 72° C. Reactions effected during practice of the invention may be represented by—

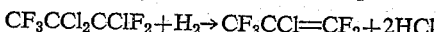
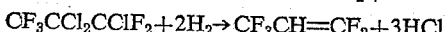
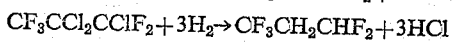

An important feature of the invention is the nature of the catalytic material employed and the composition thereof. This catalyst consists of palladium supported on activated carbon. It has been found that the catalysts described afford two marked advantages, namely, facilitate use of moderate reaction temperatures, and effect high yields of sought-for products, which yields, within limits may be made selective by alteration of reaction conditions. With regard to preparation of the catalyst, a water-soluble palladium salt which is capable of reduction to elemental palladium by hydrogen may be employed. Readily available palladium chloride is preferred. Any of the commercial activated carbons may be used, e.g. Columbia 6G Carbon, Columbia SW Carbon, or Darco Carbon. If desirable, the activated carbon may be treated preliminarily to remove any silica by leaching with aqueous HF, water washing, and drying. The granular, activated carbon support may be immersed in an aqueous solution of palladium chloride. The carbon, carrying absorbed palladium chloride, is separated from the water and preliminarily dried at about 120° C. The catalyst may then be heated at temperatures of say 150–300° C. in a stream of hydrogen to eliminate water and reduce the palladium salt to elemental palladium. The amounts of palladium employed may be such that the finished palladium on activated carbon catalyst contains substantially in the range of 1–10.0 weight percent of metallic palladium, balance carbon. Within these limits, palladium content does not appear to be particularly critical, although we find that to obtain optimum resuts, the preferred range of palladium concentration lies substantially in the range of about 2–5 weight percent of palladium.

Practice of the invention procedurally comprises passing a gas-phase mixture of $CF_3CCl_2CClF_2$ and hydrogen thru a reaction zone containing the catalyst indicated and maintained at moderately elevated temperatures, and recovering $CF_3CH_2CHF_2$ or $CF_3CH=CF_2$ or both from the reaction zone exit. Any $CF_3CCl=CF_2$ formed may be recovered and utilized as such, e.g. as a grain fumigant, or may be recycled along with unreacted $CF_3CCl_2CClF_2$. Apparatus may comprise preferably a tubular reactor, made of nickel or other suitable material such as Inconel, Monel and stainless steel, mounted in a furnace provided with means for maintaining the reaction zone in the reactor at the desired elevated internal temperature. The reactor may include inlets for introduction of controlled amounts of hydrogen and vaporous $CF_3CCl_2CClF_2$, and may be provided with a reaction product exit connected to a more or less conventional product recovery system.

Significant reaction and substitution of hydrogen for chlorine are effected at temperatures as low as about 150° C., although for commercially substantial results, temperatures are preferably not less than about 175° C. In general, increase in temperature increases hydrogen substitution, and temperatures as high as about 400° C. may be employed without effecting too undesirable decomposition. However, with reasonably suitable hydrogen concentration and residence time no particular advantages accrue by use of temperatures in excess of about 350° C. Accordingly, preferred temperatures lie substantially in the range of 175–350° C.

Hydrogen may be employed in any quantity sufficient to react with a significant amount of the $CF_3CCl_2CClF_2$ starting material. Stoichiometric amounts of reactants are noted above. Hydrogen to organic starting material mol ratios may be varied considerably and lie within the range of about 1.5 to 4 mols of hydrogen per mol of organic starting material. To avoid high reaction temperature and to minimize or substantially eliminate formation of $CF_3CCl=CF_2$ if this product is not desired, it is preferred to employ hydrogen in such quantity as to provide in the reaction zone about 2.5 to 4 mols of hydrogen per mol of organic starting material.

Contact or residence time necessary to effect a desired percentage of reaction is dependent to some extent upon temperature and hydrogen concentration. Thus, increased temperature and hydrogen concentration facilitate shorter contact time and vice versa. In view of the interdependent relation of temperature, hydrogen to organic starting material mol ratio, and residence time, as demonstrated by dependent examples, it has been found possible to carry out the reaction under sufficiently high hydrogen concentration conditions substantially in the range of 3–4 mols of hydrogen per mol of $CF_3CCl_2CClF_2$, and under sufficiently high temperature conditions substantially in the range of 250–350° C., and for a residence time sufficiently long to effect formation of reaction zone exit products containing a dominant weight proportion of $CF_3CH_2CHF_2$. Thus, by sufficient increase of temperature and/or hydrogen concentration, the reaction may be carried out so as to effect formation of reaction zone exit products containing a dominant weight proportion of $CF_3CH_2CHF_2$, and, if desired, no significant amount of $CF_3CCl=CF_2$. Contact time may lie in the range of 2 to 20 seconds, preferably 5 to 10 seconds. Depending upon the composition and relative quantities of products desired, with regard to temperature, mol ratio of hydrogen to organic starting material, contact time, and catalyst composition with respect to palladium, optimum conditions may be determined by test run.

Materials exiting the reaction zone comprise sought-for products

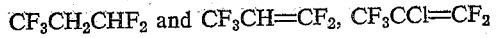

if desired, HCl, and any unreacted starting material and hydrogen. Exit products of the reactor may be passed into a water scrubber which removes most of the HCl, thru a 20% NaOH solution which removes last traces of acid, thru a $CaCl_2$ drying tower, and thence into a cold trap cooled by a Dry Ice-acetone mixture. Any unreacted hydrogen passes thru the cold trap unabsorbed. The various constituents of the cold trap condensate may be recovered and isolated by fractional distillation. Any unreacted starting material which might collect in the water scrubber may be recovered by conventional methods.

The following illustrate practice of the invention. Percentages are by weight unless otherwise indicated.

*Example 1.*—A catalyst consisting of 3% by weight metallic palladium supported on 8–10 mesh Columbia Carbon Grade 6G was prepared substantially as above described. About 90 cc. of such catalyst were disposed in a central 18 inch long length of a 0.5 inch I.P.S. nickel pipe reactor 36 inches long heated externally over 24 inches of length by an electric furnace provided with automatic temperature control. The reactor was provided at one end with suitable inlets for hydrogen and organic starting material, and the other end with a pipe connection to a products recovery unit. During about 6.5 hours a vaporous mixture of about 347 g. (1.46 mols) of $CF_3CCl_2CClF_2$ and 4.9 mols of hydrogen were passed at about constant rate into the reactor. Molecular ratio of hydrogen to organic material was about 3.3:1, and residence time in the reactor was about 8 seconds. Throughout the run temperature was maintained substantially in the range of 175–190° C. Exit products of the reactor were passed thru a water scrubber which removed most of the HCl, through a 20% NaOH solution which removed last traces of acid, thru a $CaCl_2$ drying tower, and thence into a cold trap cooled by a Dry Ice-acetone mixture, the gaseous exit of the cold trap being unutilized hydrogen. About 190 g. of condensate, recovered in the cold trap, were subjected to fractional distillation. There were recovered about 29 g. (0.216 mol) of $CF_3CH=CF_2$ boiling at about minus 22° C.; about 22 g. (0.183 mol) of material boiling in the range of about minus 22° C. to plus 13° C.; about 108 g. (0.805 mol) of material boiling at about 14° C. and identified as $CF_3CH_2CHF_2$; and 22 g. (0.093 mol) of unreacted $CF_3CCl_2CClF_2$ starting material. Sample loss was about 9 g. The minus 22°–plus 13° C. fraction comprised about 0.146 mol of $CF_3CCl=CF_2$ plus about 0.037 mol of $CF_3CH=CF_2$ and $CF_3CH_2CHF_2$. These recovered quantities represented about 15–16% of the fed organic starting material converted to pentafluoropropene, $CF_3CH=CF_2$; about 60% to 1,2,2 trihydropentafluoropropane, $CF_3CH_2CHF_2$; approximately 10% to monochloroperfluoropropene, and about 6–7% of unreacted starting material. Overall conversion of starting material to reaction products was about 86%, and overall recovery of organic material was about 93%. Hydrogen utilization was about 61–62%. Molecular weight determination with regard to the 14° C. $CF_3CH_2CHF_2$ fraction indicated a value of about 134. Infrared analysis showed presence of hydrogen and C—F bonds with no unsaturation.

*Example 2.*—Apparatus, catalyst, reaction temperature and residence time were the same as in Example 1. During about 4.5 hours a vaporous mixture of about 374 g. (1.54 mols) of $CF_3CCl_2CClF_2$ and 3.3 mols of hydrogen were passed at about constant rate into the reactor. Molecular ratio of hydrogen to organic material was about 2.1:1. Exit products of the reactor were handled as in Example 1. About 229 g. of condensate, recovered in the cold trap, were subjected to fractional distillation. There were recovered about 54 g. (0.410 mol) of $CF_3CH=CF_2$ boiling at about minus 22° C.; about 91 g. (0.565 mol) of material boiling in the range of about minus 22° C. to plus 13° C.; about 31 g. (0.232 mol) of material boiling at about 14° C. and identified as $CF_3CH_2CHF_2$; and about 43 g. (0.185 mol) of unreacted $CF_3CCl_2CClF_2$ starting material. Sample loss including about a 6 g. forerun, was about 10 g. The minus 22°–plus 13° C. fraction comprised about 0.452 mol of $CF_3CCl=CF_2$ and about 0.113 mol of $CF_3CH_2CHF_2$. These recovered quantities represented about 26–27% of the fed organic starting material converted to pentafluoropropene, 22–23% to 1,2,2 trihydropentafluoropropane, 29–30% to monochloroperfluoropropene, and about 12% of unreacted starting material. Overall conversion of starting material to reaction products including the forerun, was about 81–82%, and overall recovery of organic material including the 6 g. (3%) forerun, was about 93–94%. Hydrogen utilization was about 66%.

*Example 3.*—Apparatus, catalyst and residence time were the same as in Example 1. During about 5.5 hours a vaporous mixture of about 284 g. (1.19 mols) of $CF_3CCl_2CClF_2$ and 4.4 mols of hydrogen were passed at about constant rate into the reactor. Molecular ratio of hydrogen to organic material was about 3.7:1. Throughout the run temperature was maintained at about 325° C. Exit products of the reactor were handled as in Example 1. About 159 g. of condensate, recovered in the cold trap, were subjected to fractional distillation. There were recovered about 49 g. of a $CF_3CH=CF_2$ fraction boiling at about minus 22° C.; about 29 g. of a fraction boiling in the range of about minus 22° C. to plus 13–14° C.; about 82 g. (including a 13 g. hold-up) of material boiling at about 14–14.5° C. and identified as $CF_3CH_2CHF_2$; and no unreacted $CF_3CCl_2CClF_2$ starting material. The 29 g. fraction, boiling at about minus 22 to plus 13–14° C. contained no recoverable $CF_3CCl=CF_2$, and comprised about equal weight parts of $CF_3CH=CF_2$ and $CF_3CH_2CHF_2$. These quantities represent about 0.485 mol recovery of $CF_3CH=CF_2$ and 0.715 mol recovery of $CF_3CH_2CHF_2$. Percentagewise, the quantities represent about 40–41% of the fed organic starting material converted to pentafluoropropene, and about 59–60% to 1,2,2 trihydropentafluoropropane. Overall conversion of starting material to reaction products and overall recovery of organic material were practically 100%. Hydrogen utilization was about 71%.

$CF_3CH_2CHF_2$, being a colorless non-flammable liquid having a boiling point of 14° C., is notably adaptable for use as a diluent of propellents such as $CCl_2F_2$, $CHCl_2F$, and $CH_3CClF_2$ used in aerosol formulations, functioning similarly to the well known $CCl_3F$. $CF_3CH_2CHF_2$ is especially suitable for this purpose because the presence of hydrogen in the molecule increases miscibility with and solubility of many diluting and active constituents, such as hydrocarbons, plasticizers, polymers, and insecticides, commonly used in aerosol compositions. $CF_3CH=CF_2$ is useful in the production of copolymers of $CF_3CH=CF_2$ and $CClF=CF_2$, which copolymers may be made by conventional polymerization processes employing redox catalyst, and which copolymers are useful in the preparation of molded products and coating applications for corrosion protection, e.g. wire coating.

We claim:

1. The process of hydrogenating 1,2,2 trichloropentafluoropropane which comprises subjecting the same, at temperatures substantially in the range of 175–350° C. and while in the presence of palladium-activated carbon catalyst, to the action of hydrogen in quantity and for a time sufficient to effect formation of a substantial amount of a hydrogenated straight-chain three carbon atom hydrocarbon consisting of carbon, fluorine and hydrogen and having respective terminal carbon atoms tri- and difluorinated and the said difluorinated carbon atom containing from zero to one hydrogen atom, and recovering such hydrogenated hydrocarbon from the resulting reaction products.

2. The process of hydrogenating 1,2,2 trichloropentafluoropropane which comprises subjecting the same, while in the presence of palladium-activated carbon catalyst, to the action of hydrogen, under sufficiently high hydrogen concentration conditions substantially in the range of 3–4 mols of hydrogen per mol of $CF_3CCl_2CClF_2$, and under sufficiently high temperature conditions substantially in the range of 250–350° C. and for residence time sufficiently long, to effect formation of reaction products containing a dominant weight proportion of $CF_3CH_2CHF_2$, and recovering $CF_3CH_2CHF_2$ from such reaction products.

References Cited in the file of this patent

UNITED STATES PATENTS

| 2,413,695 | Downing et al. | Jan. 7, 1947 |
| 2,560,838 | Arnold | July 17, 1951 |
| 2,615,926 | Benning et al. | Oct. 28, 1952 |
| 2,704,775 | Clark | Mar. 22, 1955 |
| 2,760,997 | Rucker et al. | Aug. 28, 1956 |
| 2,802,887 | Miller et al. | Aug. 13, 1957 |

OTHER REFERENCES

Haszeldine: Jour. Chem. Soc. (London), 1953, pp. 2622–6, only p. 2624 needed.

Haszeldine et al.: Jour. Chem. Soc. (London), 1954, pp. 923–5, only p. 923 needed.

Simons: Fluorine Chemistry, Academic Press Inc., N.Y., vol. I, p. 501.